US012756733B2

(12) United States Patent
Singh et al.

(10) Patent No.: US 12,756,733 B2
(45) **Date of Patent: *Oct. 6, 2026**

(54) SECURE DEVICE SELECTION BASED ON SENSITIVE CONTENT DETECTION

(71) Applicant: Citrix Systems, Inc., Fort Lauderdale, FL (US)

(72) Inventors: Manbinder Pal Singh, Coral Springs, FL (US); Devyash Sanghai, Pompano Beach, FL (US)

( * ) Notice: Subject to any disclaimer, the term of this patent is extended or adjusted under 35 U.S.C. 154(b) by 769 days.

This patent is subject to a terminal disclaimer.

(21) Appl. No.: 17/523,181

(22) Filed: Nov. 10, 2021

(65) Prior Publication Data

US 2022/0070206 A1 Mar. 3, 2022

Related U.S. Application Data

(63) Continuation of application No. 16/369,648, filed on Mar. 29, 2019, now Pat. No. 11,201,889.

(51) Int. Cl.
*H04L 9/40* (2022.01)
*G06F 21/60* (2013.01)

(52) U.S. Cl.
CPC ........ *H04L 63/1433* (2013.01); *G06F 21/604* (2013.01); *H04L 63/20* (2013.01)

(58) Field of Classification Search
CPC ... H04L 63/1433; H04L 63/20; G06F 21/604; G06F 21/554
USPC .............................................................. 726/25
See application file for complete search history.

(56) References Cited

U.S. PATENT DOCUMENTS

| | | | |
|---|---|---|---|
| 5,801,697 | A | 9/1998 | Parikh |
| 6,429,883 | B1 | 8/2002 | Plow |
| 6,937,730 | B1 | 8/2005 | Buxton |
| 7,729,480 | B1 | 6/2010 | Packingham |

(Continued)

FOREIGN PATENT DOCUMENTS

| | | | |
|---|---|---|---|
| CN | 102938801 | A | 2/2013 |
| CN | 103218568 | A | 7/2013 |

(Continued)

OTHER PUBLICATIONS

"IBM Researchers Develop Shield To Mask Sensitive On-Screen Info" Downloaded from https://www.firstpost.com/business/biztech/ibm-researchers-develop-shield-to-mask-sensitive-on-screen-info-1873185.html; Jul. 10, 2009; 11 pages.

(Continued)

*Primary Examiner* — Pramila Parthasarathy

(57) ABSTRACT

Methods and systems for performing secure device selection based on sensitive content detection are described herein. The methods and systems may analyze content being accessed via a virtual session established with a first device to determine that at least a portion of the content is sensitive content, determine information indicating one or more security features of the first device and one or more security features of a second device associated with a user of the first device, determine, based on the information, that the second device is more secure than the first device, and, responsive to the determination that the second device is more secure than the first device, transfer the virtual session to the second device or enter a more secure configuration of the first device.

14 Claims, 10 Drawing Sheets

(56) References Cited

U.S. PATENT DOCUMENTS

| | | | | |
|---|---|---|---|---|
| 8,171,423 | B2 | 5/2012 | Olsen | |
| 8,219,766 | B1 | 7/2012 | Orcutt | |
| 8,578,504 | B2 | 11/2013 | Brown | |
| 8,726,343 | B1 | 5/2014 | Borzycki | |
| 8,799,668 | B2 | 8/2014 | Cheng | |
| 8,826,169 | B1 | 9/2014 | Yacoub | |
| 8,914,892 | B2 | 12/2014 | Karande | |
| 9,015,082 | B1 | 4/2015 | Jaiswal | |
| 9,082,136 | B1 | 7/2015 | Hewinson | |
| 9,137,232 | B2 | 9/2015 | Eschbach | |
| 9,268,398 | B2 | 2/2016 | Tipirneni | |
| 9,466,266 | B2 | 10/2016 | Hildreth | |
| 9,537,716 | B1 * | 1/2017 | Earl | H04L 41/0856 |
| 9,574,671 | B1 | 2/2017 | Amberg | |
| 9,626,528 | B2 | 4/2017 | Butler | |
| 9,680,836 | B2 | 6/2017 | White | |
| 9,691,027 | B1 * | 6/2017 | Sawant | G06F 21/6245 |
| 9,767,585 | B1 | 9/2017 | Carter, Jr. | |
| 9,898,619 | B1 | 2/2018 | Hadsall | |
| 9,977,909 | B1 | 5/2018 | Austin | |
| 10,032,037 | B1 | 7/2018 | Allen | |
| 10,043,033 | B1 | 8/2018 | Hadsall | |
| 10,255,053 | B2 | 4/2019 | Giri | |
| 10,305,683 | B1 | 5/2019 | Ghafourifar | |
| 10,325,103 | B1 | 6/2019 | Austin | |
| 10,347,293 | B1 | 7/2019 | Skinner | |
| 10,430,350 | B1 | 10/2019 | Nimry | |
| 10,438,010 | B1 | 10/2019 | Goodsitt | |
| 10,511,698 | B1 | 12/2019 | Chen | |
| 10,552,585 | B2 | 2/2020 | Verthein | |
| 10,614,454 | B1 | 4/2020 | Brooks, V | |
| 10,664,615 | B1 | 5/2020 | Schenkein | |
| 10,686,824 | B2 | 6/2020 | Petry | |
| 10,701,079 | B1 | 6/2020 | Ledet | |
| 10,853,019 | B1 | 12/2020 | Schwabacher | |
| 11,184,406 | B1 | 11/2021 | Shashank | |
| 11,455,423 | B2 | 9/2022 | Kochura | |
| 11,645,416 | B1 * | 5/2023 | Fakhraie | G06F 21/6218<br>705/50 |
| 2004/0193910 | A1 | 9/2004 | Moles | |
| 2004/0255137 | A1 | 12/2004 | Ying | |
| 2005/0240533 | A1 | 10/2005 | Cutter | |
| 2005/0277428 | A1 | 12/2005 | Nathan Brown | |
| 2006/0075040 | A1 | 4/2006 | Chmaytelli | |
| 2006/0129948 | A1 | 6/2006 | Hamzy | |
| 2006/0277220 | A1 | 12/2006 | Patrick | |
| 2007/0005713 | A1 | 1/2007 | Levasseur | |
| 2007/0103552 | A1 | 5/2007 | Patel | |
| 2008/0034373 | A1 | 2/2008 | Glynn | |
| 2008/0103799 | A1 | 5/2008 | Domenikos | |
| 2008/0148067 | A1 | 6/2008 | Sitrick | |
| 2008/0226199 | A1 | 9/2008 | Breglio | |
| 2008/0266467 | A1 | 10/2008 | Okamoto | |
| 2008/0279369 | A1 | 11/2008 | Palmer | |
| 2009/0147958 | A1 | 6/2009 | Calcaterra | |
| 2009/0257591 | A1 | 10/2009 | Mithal | |
| 2009/0259967 | A1 | 10/2009 | Davidson | |
| 2009/0262931 | A1 | 10/2009 | Nakagata | |
| 2010/0045570 | A1 | 2/2010 | Takata | |
| 2010/0049743 | A1 | 2/2010 | Schmidt | |
| 2010/0110095 | A1 | 5/2010 | Sekiguchi | |
| 2010/0161644 | A1 | 6/2010 | Crim | |
| 2010/0205667 | A1 | 8/2010 | Anderson | |
| 2010/0251374 | A1 | 9/2010 | Dill | |
| 2010/0275267 | A1 | 10/2010 | Walker | |
| 2011/0029774 | A1 | 2/2011 | Zunke | |
| 2011/0032913 | A1 | 2/2011 | Patil | |
| 2011/0088086 | A1 | 4/2011 | Swink | |
| 2011/0161656 | A1 | 6/2011 | Rao | |
| 2011/0251992 | A1 | 10/2011 | Bethlehem | |
| 2011/0258195 | A1 | 10/2011 | Welling | |
| 2011/0302442 | A1 | 12/2011 | Garrett | |
| 2012/0005475 | A1 | 1/2012 | Inagaki | |
| 2012/0023571 | A1 | 1/2012 | Spies | |
| 2012/0098639 | A1 | 4/2012 | Ijas | |

| | | | |
|---|---|---|---|
| 2012/0110174 | A1 | 5/2012 | Wootton |
| 2012/0198368 | A1 | 8/2012 | Bornheimer |
| 2012/0226742 | A1 | 9/2012 | Momchilov |
| 2012/0260307 | A1 | 10/2012 | Sambamurthy |
| 2012/0303558 | A1 | 11/2012 | Jaiswal |
| 2012/0323717 | A1 | 12/2012 | Kirsch |
| 2013/0007895 | A1 | 1/2013 | Brolley |
| 2013/0019186 | A1 | 1/2013 | Lance |
| 2013/0054635 | A1 | 2/2013 | Phelps |
| 2013/0117670 | A1 | 5/2013 | Mahajan |
| 2013/0145457 | A1 | 6/2013 | Papakipos |
| 2013/0162817 | A1 | 6/2013 | Bernal |
| 2013/0172027 | A1 | 7/2013 | Sturges |
| 2013/0201534 | A1 | 8/2013 | Carlen |
| 2013/0298076 | A1 | 11/2013 | Rice |
| 2013/0339744 | A1 | 12/2013 | Nagai |
| 2013/0344966 | A1 | 12/2013 | Mustafa |
| 2014/0053232 | A1 | 2/2014 | Coles |
| 2014/0189055 | A1 | 7/2014 | Etchegoyen |
| 2014/0195798 | A1 | 7/2014 | Brugger |
| 2014/0201527 | A1 | 7/2014 | Krivorot |
| 2014/0215356 | A1 | 7/2014 | Brander |
| 2014/0259184 | A1 | 9/2014 | Hoyer |
| 2014/0268244 | A1 | 9/2014 | Sheridan |
| 2014/0280509 | A1 | 9/2014 | Merrells |
| 2014/0283127 | A1 | 9/2014 | Chacko |
| 2014/0351955 | A1 | 11/2014 | White |
| 2015/0058997 | A1 | 2/2015 | Lee |
| 2015/0074506 | A1 | 3/2015 | Dunn |
| 2015/0074615 | A1 | 3/2015 | Han |
| 2015/0089357 | A1 | 3/2015 | Vandervort |
| 2015/0113666 | A1 | 4/2015 | Buck |
| 2015/0149529 | A1 | 5/2015 | Loader |
| 2015/0200922 | A1 | 7/2015 | Eschbach |
| 2015/0271206 | A1 | 9/2015 | Schultz |
| 2015/0278534 | A1 | 10/2015 | Thiyagarajan |
| 2015/0281446 | A1 | 10/2015 | Milstein |
| 2015/0287279 | A1 | 10/2015 | Nichols |
| 2015/0288633 | A1 | 10/2015 | Ogundokun |
| 2015/0346959 | A1 | 12/2015 | Ruben |
| 2015/0350136 | A1 | 12/2015 | Flynn, III |
| 2016/0011731 | A1 | 1/2016 | Pasquero |
| 2016/0050526 | A1 | 2/2016 | Liu |
| 2016/0054911 | A1 | 2/2016 | Edwards |
| 2016/0078247 | A1 | 3/2016 | Tucker |
| 2016/0092685 | A1 | 3/2016 | Tse |
| 2016/0098414 | A1 | 4/2016 | Edmonds |
| 2016/0099935 | A1 | 4/2016 | Luskin |
| 2016/0100046 | A1 | 4/2016 | Meru |
| 2016/0112209 | A1 | 4/2016 | Yoon |
| 2016/0156638 | A1 | 6/2016 | Somani |
| 2016/0179454 | A1 | 6/2016 | Liu |
| 2016/0188883 | A1 | 6/2016 | Wang |
| 2016/0188973 | A1 | 6/2016 | Ziaja |
| 2016/0191442 | A1 | 6/2016 | Penilla |
| 2016/0255084 | A1 | 9/2016 | White |
| 2016/0261735 | A1 | 9/2016 | Candelore |
| 2016/0269440 | A1 | 9/2016 | Hartman |
| 2016/0270648 | A1 | 9/2016 | Freeman |
| 2016/0294823 | A1 | 10/2016 | Mckeithan, II |
| 2016/0307002 | A1 | 10/2016 | Zha |
| 2016/0328522 | A1 | 11/2016 | Howley |
| 2016/0378869 | A1 | 12/2016 | Nittka |
| 2017/0004331 | A1 | 1/2017 | Weldon |
| 2017/0032150 | A1 | 2/2017 | Hamlin |
| 2017/0061409 | A1 | 3/2017 | Morecki |
| 2017/0068829 | A1 | 3/2017 | Shaw |
| 2017/0134645 | A1 | 5/2017 | Kim |
| 2017/0187751 | A1 | 6/2017 | Andrews |
| 2017/0249432 | A1 | 8/2017 | Grantcharov |
| 2017/0264506 | A1 | 9/2017 | Singhal |
| 2017/0323099 | A1 | 11/2017 | Song |
| 2017/0351909 | A1 | 12/2017 | Kaehler |
| 2017/0359717 | A1 | 12/2017 | Adler |
| 2017/0364595 | A1 | 12/2017 | Desai |
| 2017/0372527 | A1 | 12/2017 | Murali |
| 2018/0014150 | A1 | 1/2018 | Elias |
| 2018/0053003 | A1 | 2/2018 | Nair |
| 2018/0054414 | A1 | 2/2018 | Levasseur |

(56) References Cited

U.S. PATENT DOCUMENTS

| | | | |
|---|---|---|---|
| 2018/0071634 | A1 | 3/2018 | Carvallo |
| 2018/0082068 | A1 | 3/2018 | Lancioni |
| 2018/0122506 | A1 | 5/2018 | Grantcharov |
| 2018/0124027 | A1 | 5/2018 | Venkiteswaran |
| 2018/0136898 | A1 | 5/2018 | Shi |
| 2018/0145835 | A1 | 5/2018 | Barbour |
| 2018/0150647 | A1 | 5/2018 | Naqvi |
| 2018/0164589 | A1 | 6/2018 | Watanabe |
| 2018/0165427 | A1 | 6/2018 | Verthein |
| 2018/0183581 | A1 | 6/2018 | Elbaz |
| 2018/0189461 | A1 | 7/2018 | Ghafourifar |
| 2018/0189504 | A1 | 7/2018 | Ghafourifar |
| 2018/0189505 | A1 | 7/2018 | Ghafourifar |
| 2018/0191686 | A1 | 7/2018 | Ghafourifar |
| 2018/0191701 | A1 | 7/2018 | Kong |
| 2018/0225019 | A1 | 8/2018 | Xie |
| 2018/0262480 | A1 | 9/2018 | Doi |
| 2018/0276393 | A1 | 9/2018 | Allen |
| 2018/0285591 | A1 | 10/2018 | Thayer |
| 2018/0285592 | A1 | 10/2018 | Sharifi |
| 2018/0321826 | A1 | 11/2018 | Bereza |
| 2018/0336373 | A1 | 11/2018 | Deenadayal |
| 2018/0337918 | A1 | 11/2018 | Chang |
| 2018/0343321 | A1 | 11/2018 | Chang |
| 2018/0351961 | A1 | 12/2018 | Calcaterra |
| 2019/0012646 | A1 | 1/2019 | Seidl |
| 2019/0013646 | A1 | 1/2019 | Tan |
| 2019/0019177 | A1 | 1/2019 | Lee |
| 2019/0042059 | A1 | 2/2019 | Baer |
| 2019/0050592 | A1 | 2/2019 | Grau |
| 2019/0068686 | A1* | 2/2019 | Väänänen ............. H04L 9/0861 |
| 2019/0068687 | A1 | 2/2019 | Masi |
| 2019/0073490 | A1 | 3/2019 | Agrawal |
| 2019/0080072 | A1 | 3/2019 | Van Os |
| 2019/0102263 | A1 | 4/2019 | Singh |
| 2019/0102574 | A1 | 4/2019 | Roberts |
| 2019/0147169 | A1 | 5/2019 | Adams |
| 2019/0171794 | A1 | 6/2019 | Dhruva |
| 2019/0213102 | A1 | 7/2019 | Raviv |
| 2019/0220609 | A1 | 7/2019 | Ghazanfari |
| 2019/0266337 | A1 | 8/2019 | Sengupta |
| 2019/0278940 | A1 | 9/2019 | Huang |
| 2019/0278961 | A1 | 9/2019 | Schrader |
| 2019/0279344 | A1 | 9/2019 | Duggal |
| 2019/0289419 | A1 | 9/2019 | Eronen |
| 2019/0306132 | A1 | 10/2019 | Le Van Gong |
| 2019/0327215 | A1 | 10/2019 | Bastian |
| 2019/0349366 | A1 | 11/2019 | Dewan |
| 2019/0361572 | A1 | 11/2019 | Webber |
| 2019/0386971 | A1 | 12/2019 | Venkiteswaran |
| 2020/0004983 | A1 | 1/2020 | Chen |
| 2020/0012793 | A1 | 1/2020 | Avraham |
| 2020/0019729 | A1 | 1/2020 | Shanmugam |
| 2020/0026394 | A1 | 1/2020 | Rodolico |
| 2020/0028836 | A1 | 1/2020 | Gandhi |
| 2020/0065514 | A1 | 2/2020 | Keen |
| 2020/0074090 | A1 | 3/2020 | Naqvi |
| 2020/0074109 | A1 | 3/2020 | Pieniazek |
| 2020/0104539 | A1 | 4/2020 | Liu |
| 2020/0106749 | A1 | 4/2020 | Jain |
| 2020/0110301 | A1 | 4/2020 | Harrold |
| 2020/0134240 | A1 | 4/2020 | Balakrishna |
| 2020/0151243 | A1 | 5/2020 | Chauhan |
| 2020/0151348 | A1 | 5/2020 | Chauhan |
| 2020/0153911 | A1 | 5/2020 | Chauhan |
| 2020/0175209 | A1 | 6/2020 | Yost |
| 2020/0175610 | A1 | 6/2020 | Pikle |
| 2020/0193031 | A1 | 6/2020 | Avraham |
| 2020/0228561 | A1 | 7/2020 | Petry |
| 2020/0310945 | A1 | 10/2020 | Scoda |
| 2020/0311304 | A1 | 10/2020 | Parthasarathy |
| 2020/0320638 | A1 | 10/2020 | Erickson |
| 2020/0349271 | A1 | 11/2020 | Binkley |
| 2020/0380146 | A1 | 12/2020 | Dodor |
| 2021/0019441 | A1 | 1/2021 | Neves Creto |
| 2021/0021573 | A1 | 1/2021 | Scotney |
| 2021/0049280 | A1 | 2/2021 | Koshy |
| 2021/0051294 | A1 | 2/2021 | Roedel |
| 2021/0160290 | A1 | 5/2021 | Brieskorn |
| 2021/0185520 | A1 | 6/2021 | Hassan |
| 2021/0350033 | A1 | 11/2021 | Kapinos |
| 2022/0020104 | A1 | 1/2022 | Bishop |
| 2022/0021721 | A1 | 1/2022 | Liu |
| 2022/0164400 | A1 | 5/2022 | Holloway |
| 2022/0164472 | A1 | 5/2022 | Cannon |
| 2022/0164589 | A1 | 5/2022 | Upshinskii |

FOREIGN PATENT DOCUMENTS

| | | | |
|---|---|---|---|
| CN | 104794405 | A | 7/2015 |
| CN | 105162693 | A | 12/2015 |
| CN | 106716436 | A | 5/2017 |
| CN | 106933465 | A | 7/2017 |
| CN | 108509169 | A | 9/2018 |
| CN | 105976303 | B | 3/2019 |
| CN | 110378145 | A | 10/2019 |
| CN | 110998573 | A | 4/2020 |
| CN | 111338744 | A | 6/2020 |
| EP | 2874396 | A1 | 5/2015 |
| EP | 3337210 | A1 | 6/2018 |
| JP | 2011248762 | A | 12/2011 |
| JP | 2012198658 | A | 10/2012 |
| KR | 100837815 | B1 | 6/2008 |
| KR | 20150066129 | A | 6/2015 |
| WO | 2013101084 | A1 | 7/2013 |
| WO | 2015073666 | A1 | 5/2015 |
| WO | 2015120677 | A1 | 8/2015 |
| WO | 2016205241 | A | 12/2016 |
| WO | 2018102286 | A1 | 6/2018 |

OTHER PUBLICATIONS

Bickford et al., "Safe Internet Browsing using a Transparent Virtual Browser", 2015 IEEE 2nd International Conference on Cyber Security and Cloud Computing, pp. 423-432 (Year: 2015).
European Search Report and Written Opinion dated Mar. 31, 2020 for EP Application No. 19207955.6; 9 Pages.
Examination Report dated Aug. 23, 2021 for European Application No. 19207955.6; 5 Pages.
Final Office Action dated Jul. 21, 2021 for U.S. Appl. No. 16/185,724; 14 Pages.
Forte, Andrea et al., "EyeDecrypt—Private Interaction in Plain Sight", https://citeseerx.ist.psu.edu/viewdoc/download?doi= 10.1.1.380.8867&rep=rep1&type=pdf, pp. 1-14 (Year: 2014).
Goldsteen, et al., "Application-screen Masking: A Hybrid Approach;" Downloaded from https://www.firstpost.com/business/biztech/ibm-researchers-develop-shield-to-mask-sensitive-on-screen-info-1873185.html; Jul. 2015; 10 Pages.
Moreira et al., "Strategies for minimizing the influence of the use of BYOD and Cloud in organizations: 4CM Model", IEEE 11CCC 2016 (Year: 2016).
Non-Final Office Action dated Jul. 29, 2021 for U.S. Appl. No. 16/870,056; 11 Pages.
Office Action (Final Rejection) dated Aug. 30, 2021 for U.S. Appl. No. 16/716,669 (pp. 1-8).
PCT International Search Report and Written Opinion dated Feb. 16, 2021 for International Application No. PCT/US2020/061927; 13 pages.
PCT International Search Report and Written Opinion dated Feb. 23, 2021 for International Application No. PCT/CN2020/091951; 9 pages.
PCT International Search Report and Written Opinion dated Jun. 3, 2021 for International Application No. PCT/CN2020/112315; 9 pages.
PCT International Search Report and Written Opinion dated May 10, 2021 for International Application No. PCT/US2020/062770; 19 pages.
PCT International Search Report and Written Opinion dated May 26, 2021 for International Application No. PCT/CN2020/111793; 9 pages.

(56) References Cited

OTHER PUBLICATIONS

PCT International Search Report and Written Opinion dated May 27, 2021 for International Application No. PCT/CN2020/112314; 9 pages.
PCT International Search Report and Written Opinion dated Oct. 27, 2020 for International Application No. PCT/US2020/051150; 12 Pages.
PCT Invitation to Pay Additional Fees dated Mar. 16, 2021 for International Application No. PCT/US2020/062770; 12 pages.
Text Mask: Hide Confidential Page Content—Chrome Web Store; Downloaded from https://chrome.google.com/webstore/detail/text-mask-hide-confidenti/icodoomkkkhijlceahdabhkgdelffail?hl=en; Dec. 13, 2018; 6 pages.
U.S. Appl. No. 16/185,724.
U.S. Appl. No. 16/369,648.
U.S. Appl. No. 16/716,669.
U.S. Appl. No. 16/716,761.
U.S. Appl. No. 16/725,295.
U.S. Appl. No. 16/780,445.
U.S. Appl. No. 16/835,928.
U.S. Appl. No. 16/870,056.
U.S. Appl. No. 16/910,615.
U.S. Appl. No. 17/034,118.
U.S. Appl. No. 17/073,773.
U.S. Final Office Action dated Jun. 9, 2021 for U.S. Appl. No. 16/780,445; 37 pages.
U.S. Final Office Action dated May 13, 2021 for U.S. Appl. No. 17/073,773; 14 pages.
U.S. Final Office Action dated Oct. 23, 2019 for U.S. Appl. No. 16/185,724; 12 Pages.
U.S. Final Office Action dated Sep. 9, 2020 for U.S. Appl. No. 16/185,724; 11 Pages.
U.S. Non-Final Office Action dated Apr. 13, 2021 for U.S. Appl. No. 16/716,669; 21 pages.
U.S. Non-Final Office Action dated Apr. 30, 2021 for U.S. Appl. No. 16/369,648; 26 pages.
U.S. Non-Final Office Action dated Dec. 10, 2020 for U.S. Appl. No. 16/780,445; 36 pages.
U.S. Non-Final Office Action dated Feb. 16, 2021 for U.S. Appl. No. 17/034,118; 15 pages.
U.S. Non-Final Office Action dated Jun. 6, 2019 for U.S. Appl. No. 16/185,724; 11 Pages.
U.S. Non-Final Office Action dated Mar. 15, 2021 for U.S. Appl. No. 16/185,724; 14 pages.
U.S. Non-Final Office Action dated Mar. 24, 2020 for U.S. Appl. No. 16/185,724; 11 Pages.
U.S. Non-Final Office Action dated Mar. 4, 2021 for U.S. Appl. No. 17/073,773; 17 pages.
Office Action (Final Rejection) dated Jan. 26, 2022 for U.S. Appl. No. 16/870,056 (pp. 1-10).
Office Action (Non-Final Rejection) dated Dec. 21, 2021 for U.S. Appl. No. 16/716,669 (pp. 1-7).
Deep learning for source camera identification on mobile devices by David Freire-Obregón; Fabio Narducci; Silvio Barra; and Modesto Castrillón-Santana pp. 6; Available online Jan. 9 (Year: 2018).
Techniques for Position-Based Actions Using Light-Based Communication wo 2015148696 A1 (Machine Translation) Inventors: Aggarwal Anant; Breuer Christian; and Stout Barry pp. 14; Date Published: Oct. 1 (Year: 2015).
Camera recognition with deep learning By Eleni Athanasiadou, Zeno Geradts and Erwin Van Eijk pp. 9; (Year: 2018).
Method for Monitoring Event Related to Position_. JP 2001356978 A (Machine Translation) Inventors: I Anson Colin; Hawkes Rycharde Jeffery; Mcdonnell James Thomas Edward; Wilcock Lawrence and Crouch Simon E pp. 14; Date Published: Dec. 12 (Year: 2001).
Office Action (Final Rejection) dated Aug. 11, 2022 for U.S. Appl. No. 16/716,761 (pp. 1-25).
International Preliminary Report on Patentability issued in App. No. PCT/US2020/061927, mailing date Aug. 18, 2022, 8 pages.
International Preliminary Report on Patentability issued in App. No. PCT/US2020/051150, mailing date Jun. 30, 2022, 8 pages.
Hover-Over Content for User Interfaces, IPCOM000236793D, May 15, 2014, 37 pages (Year: 2015).
Office Action (Non-Final Rejection) dated Aug. 18, 2022 for U.S. Appl. No. 16/835,928 (pp. 1-24).
European Patent Office Communication pursuant to Article 94(3) EPC for App. No. EP19207955.6, dated Mar. 17, 2022, 5 pages.
Office Action (Non-Final Rejection) dated Mar. 30, 2022 for U.S. Appl. No. 16/185,724 (pp. 1-13).
International Preliminary Report on Patentability issued in App. No. PCT/US2020/062770, mailing date Oct. 13, 2022, 11 pages.
Office Action (Final Rejection) dated Oct. 25, 2022 for U.S. Appl. No. 16/910,615 (pp. 1-21).
Office Action (Non-Final Rejection) dated Jul. 8, 2022 for U.S. Appl. No. 16/910,615 (pp. 1-17).
Office Action (Final Rejection) dated Jul. 14, 2022 for U.S. Appl. No. 16/780,445 (pp. 1-24).
Office Action (Non-Final Rejection) dated Mar. 7, 2022 for U.S. Appl. No. 16/716,761 (pp. 1-23).
Office Action (Final Rejection) dated May 31, 2022 for U.S. Appl. No. 16/716,669 (pp. 1-8).
Office Action (Non-Final Rejection) dated Jun. 8, 2022 for U.S. Appl. No. 16/725,295 (pp. 1-13).

* cited by examiner

SECURE DEVICE SELECTION BASED ON SENSITIVE CONTENT DETECTION

CROSS REFERENCE TO RELATED APPLICATIONS

This application is a continuation of and claims the benefit of and priority to U.S. patent application Ser. No. 16/369,648 filed on Mar. 29, 2019, the contents of which is hereby incorporated herein by reference in its entirety.

FIELD

Aspects described herein relate generally to computer networking, software, remote access, and visualization. More specifically, aspects described herein relate to the fields of security and device management.

BACKGROUND

Users commonly access confidential, proprietary, or otherwise sensitive content on a large variety of devices, both personal and professional. With bring your own device (BYOD) policies being implemented by corporations, for example, users frequently have access to confidential business materials on their personal devices.

Devices used to access sensitive content have a wide variety of security capabilities, and may be used in a wide variety of situations and places, some of which are more secure than others. Managing secure access to sensitive content across devices and in different contexts is a challenging and growing problem.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards automatically determining when sensitive content is being accessed, alerting users that sensitive content is being accessed, and causing a session comprising the sensitive content to be transferred to another device that is more secure and/or causing the device hosting the session to change to a more secure configuration. Aspects described herein are further directed towards automatically determining that a user is no longer accessing sensitive content and returning the session back to the original device. Thus the solutions presented herein beneficially provide for automatically transferring content to a more secure device and/or reconfiguring a device to be more secure when the content is sensitive, thus maintaining increased security even in environments where content is accessed across a wide variety of devices.

According to embodiments described herein, a system may perform secure device selection based on sensitive content detection by analyzing content being accessed via a virtual session established with a first device to determine that at least a portion of the content is sensitive content, determining information indicating one or more security features of the first device and one or more security features of a second device associated with a user of the first device, determining, based on the information, that the second device is more secure than the first device, and, responsive to the determination that the second device is more secure than the first device, transferring the virtual session to the second device.

In some cases, to determine that the second device is more secure than the first device, the system generates security scores for the first device and the second device, and ranks the first device and the second device based on the corresponding security scores. Additionally or alternatively, to determine that the second device is more secure than the first device, the system may compare a location of the first device to a location of the second device.

In some cases, after determining that at least a portion of the content is sensitive content, the system transmits, to the first user device, an indication that the content is sensitive content. In some cases, the indication that the content is sensitive content comprises a sensitivity score. Additionally or alternatively, the indication that the content is sensitive content causes the first user device to display an indication that the virtual session contains sensitive content. Additionally or alternatively, the indication that the content is sensitive content causes the first user device to block display of the sensitive content.

In some cases, after the transferring of the virtual session to the second device, the system analyzes content being accessed via the virtual session transferred to the second device to determine that the content is not sensitive content, and transfers the virtual session back to the first device.

In some cases, the information indicating one or more security features of the first device comprises one or more of a screen size of the first user device, whether the first user device usually connects via a secured network, whether the first user device requires two-factor authentication to log in, the current location of the first user device, whether the first user device is connected to a corporate or public network, whether an external display is connected to the first user device, whether peripheral devices are connected to the first user device, whether the first user is currently using the first user device, whether other users are logged in to the first user device, and whether any other users are currently looking at a display of the first user device.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards controlling remote access to resources at an enterprise computing system, which may be a sensitive content management system, using managed mobile applications at mobile computing devices. An access manager may perform a validation process that determines whether a mobile application requesting access to enterprise resources has accurately identified itself and has not been subsequently altered after installation at the mobile computing device. In this way, the access manager may ensure the mobile application requesting access to the enterprise resource can be trusted and is not attempting to circumvent the security mechanisms used to protect those enterprise resources. As a result, individuals associated with the enterprise may advantageously utilize enterprise resources at their personal mobile devices.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Computing Architecture

Figure 1:
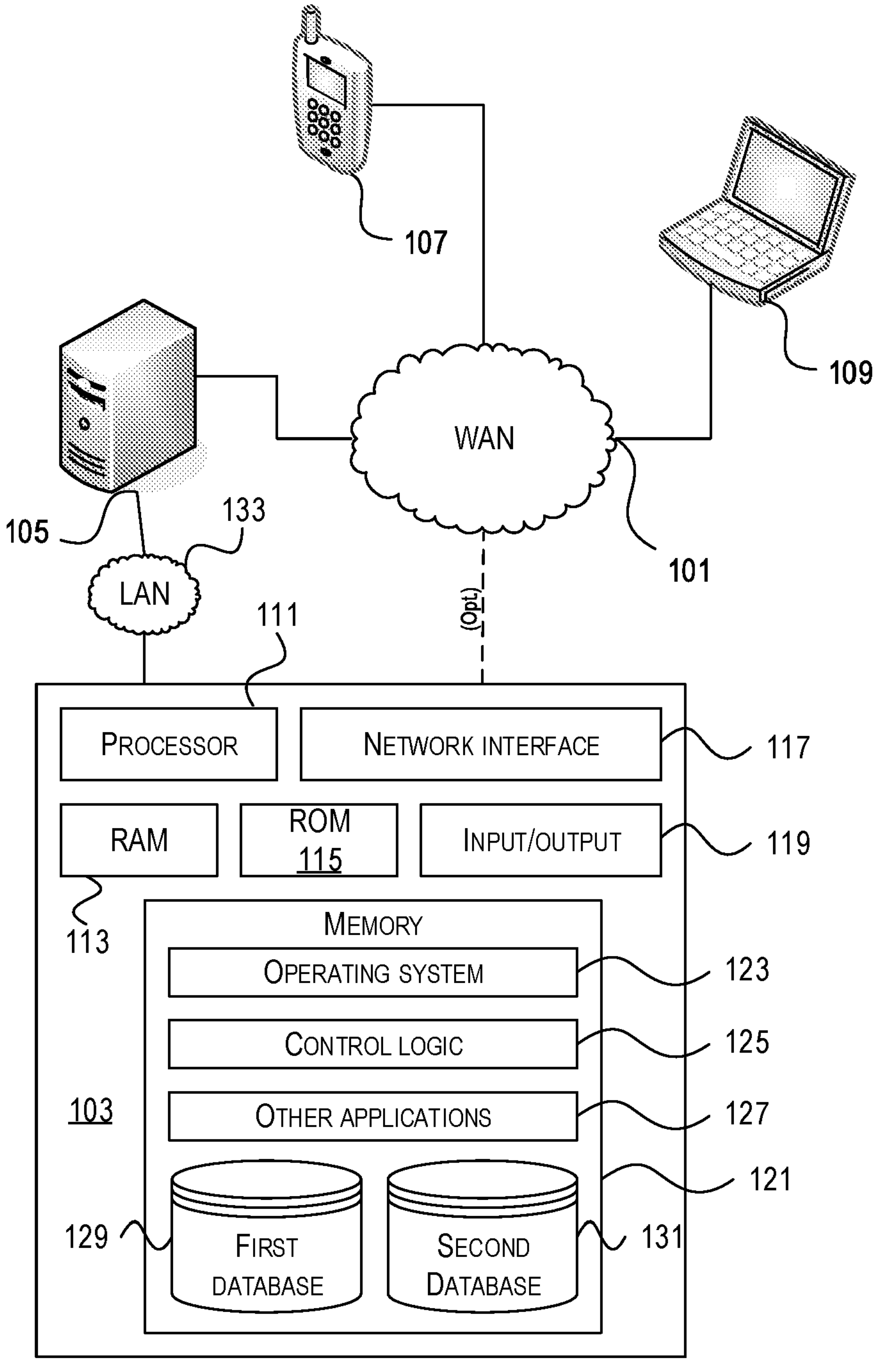
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data-attributable to a single entity-which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
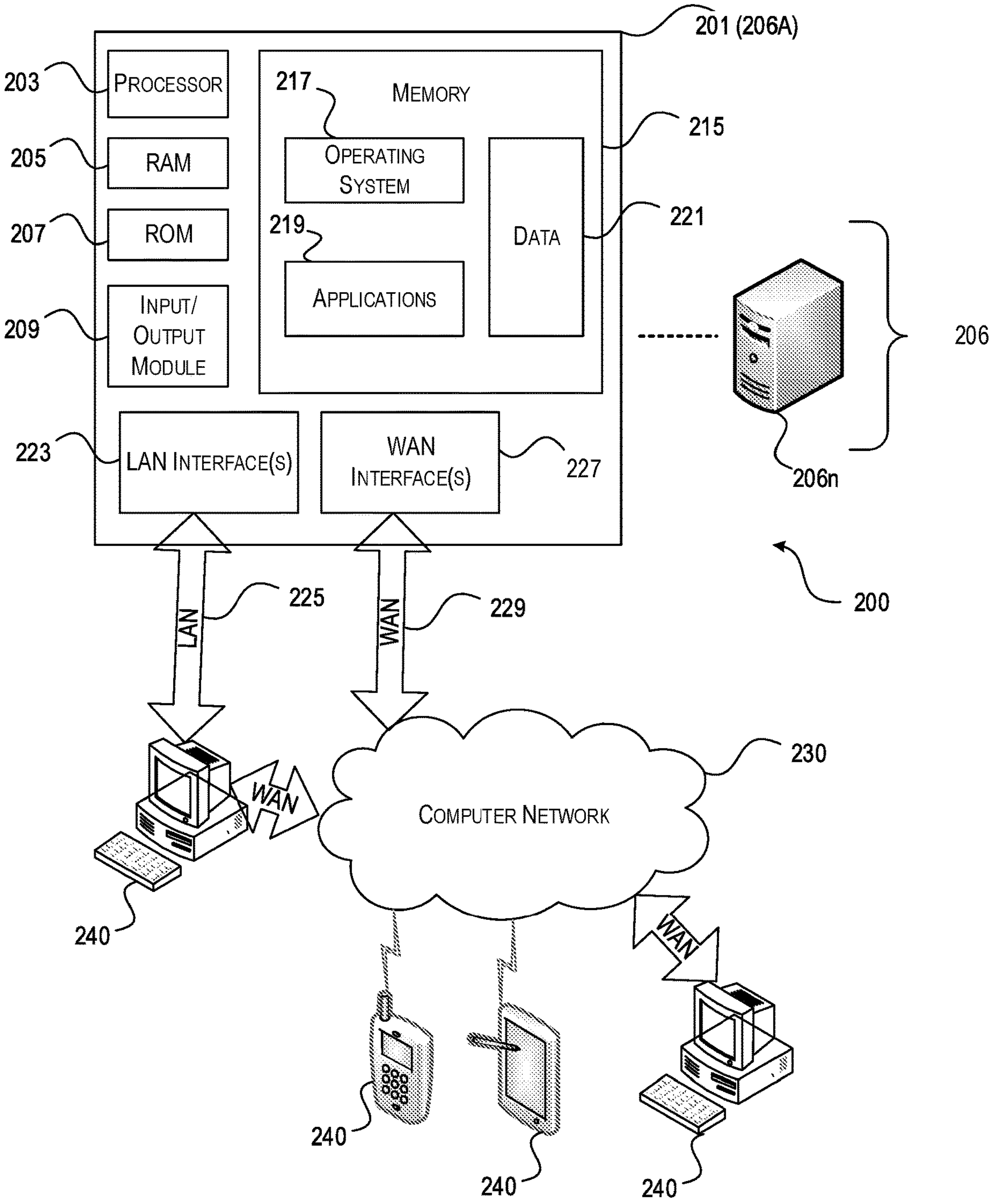
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206*a* in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206*a*-206*n* (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Washington.

A remote computing environment may include more than one server 206*a*-206*n* such that the servers 206*a*-206*n* are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206*a*-206*n* within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206*a* that receives requests from a client machine 240, forwards the request to a second server 206*b* (not shown), and responds to the request generated by the client machine 240 with a response from the second server 206*b* (not shown.) First server 206*a* may acquire an enumeration of applications available to the client machine 240 as well as address information associated with an application server 206 hosting an application identified within the enumeration of applications. First server 206*a* can then present a response to the client's request using a web interface, and communicate directly with the client 240 to provide the client 240 with access to an identified application. One or more clients 240 and/or one or more servers 206 may transmit data over network 230, e.g., network 101.

Figure 3:
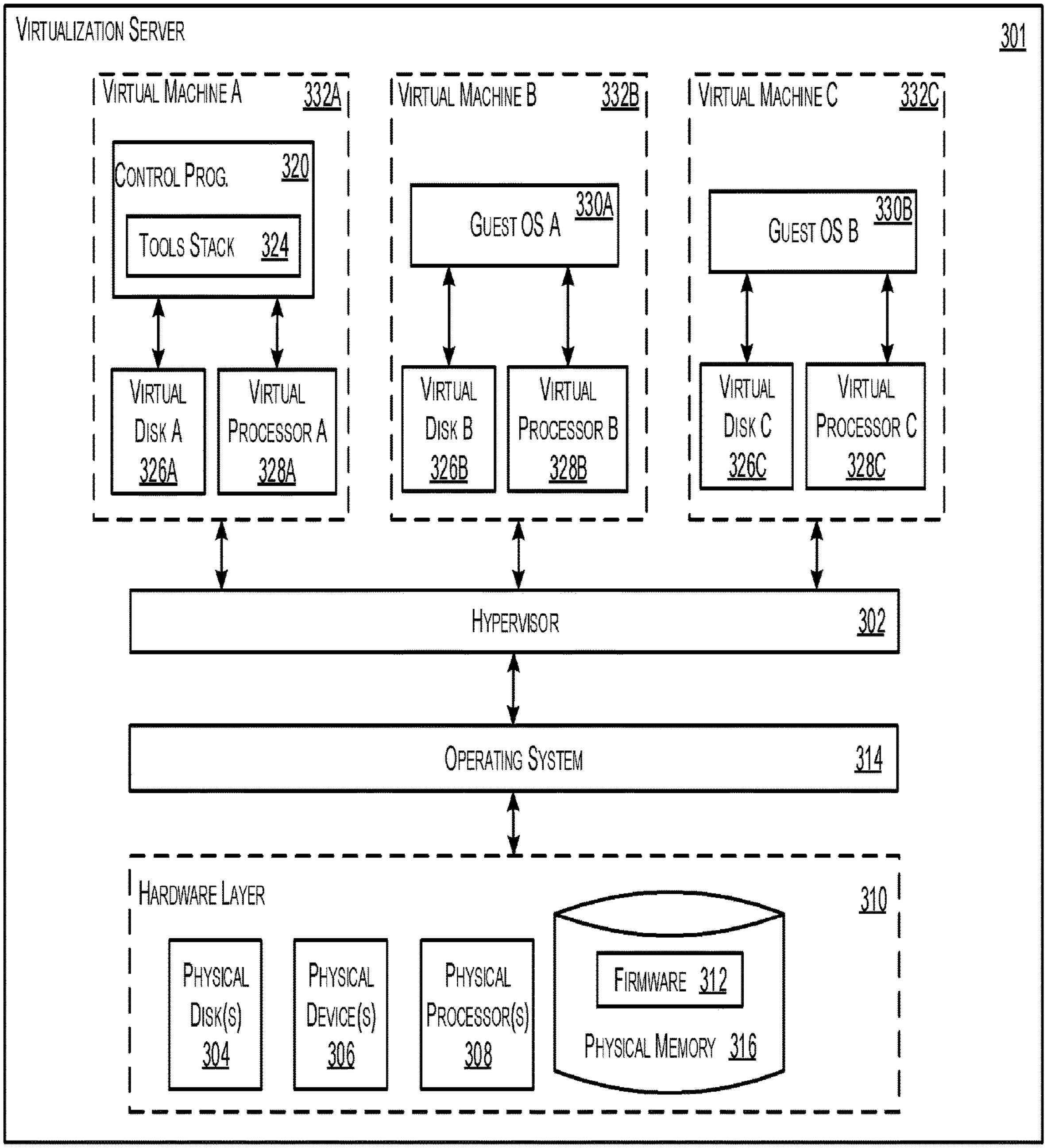
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, California; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, FL.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
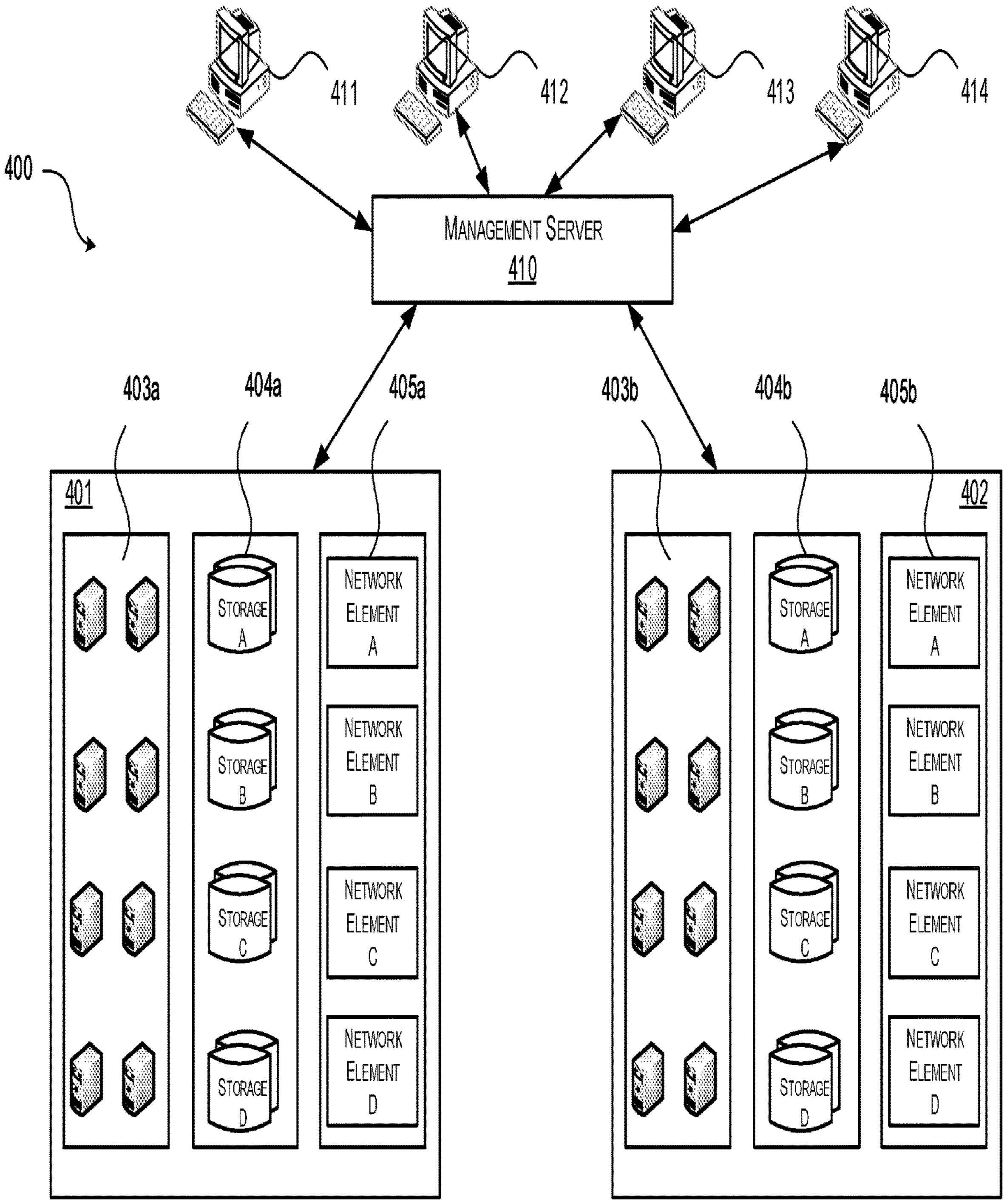
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403*a*-403*b* (generally referred herein as "host servers 403"), storage resources 404*a*-404*b* (generally referred herein as "storage resources 404"), and network elements 405*a*-405*b* (generally referred herein as "network resources 405")) of the cloud system.

Management server 410 may be implemented on one or more physical servers. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Washington), AMAZON EC2 (Amazon.com Inc. of Seattle, Washington), IBM BLUE CLOUD (IBM Corporation of Armonk, New York), or others.

Enterprise Mobility Management Architecture

Figure 5:
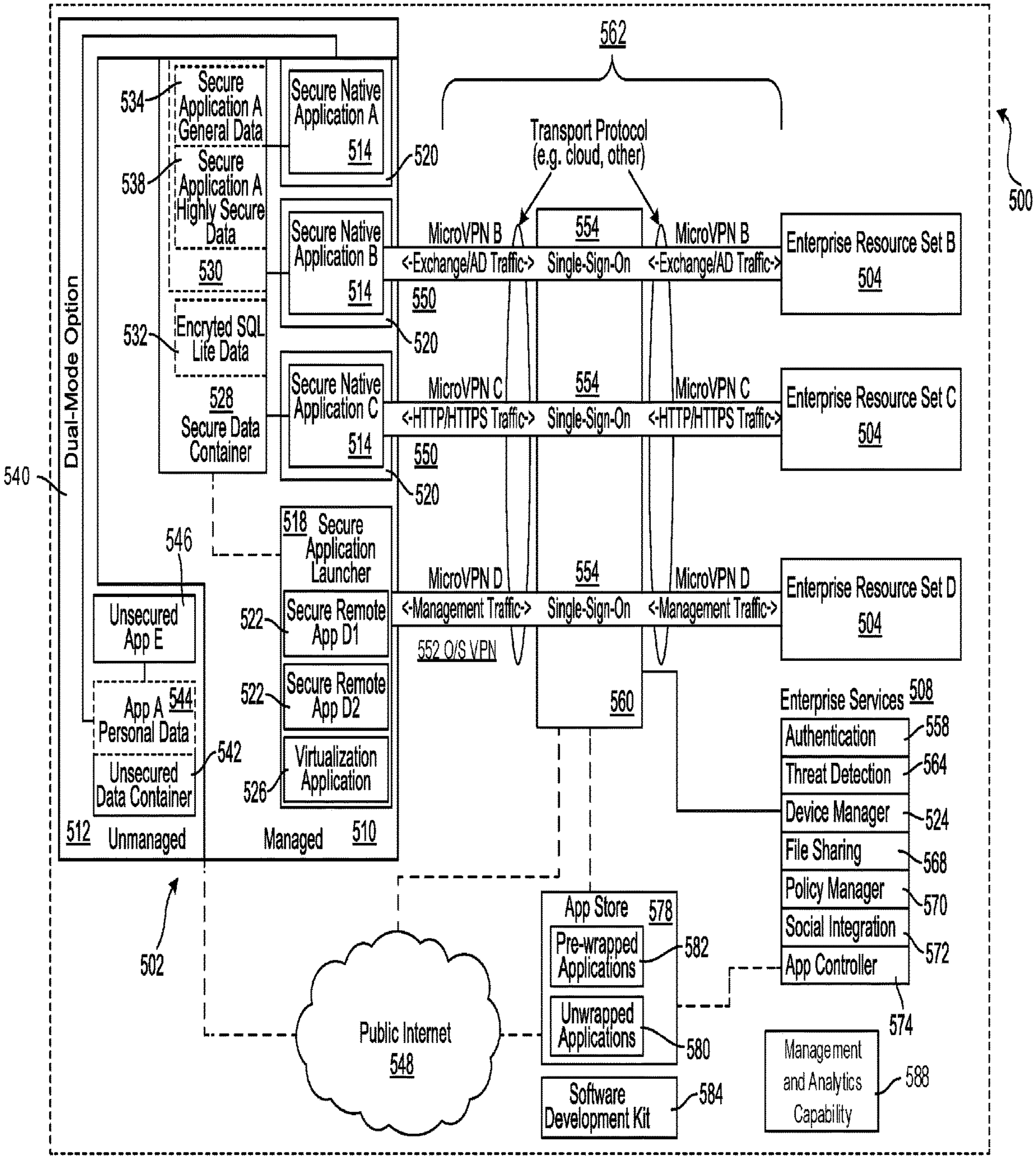
FIG. 5 depicts an illustrative enterprise mobility management system.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
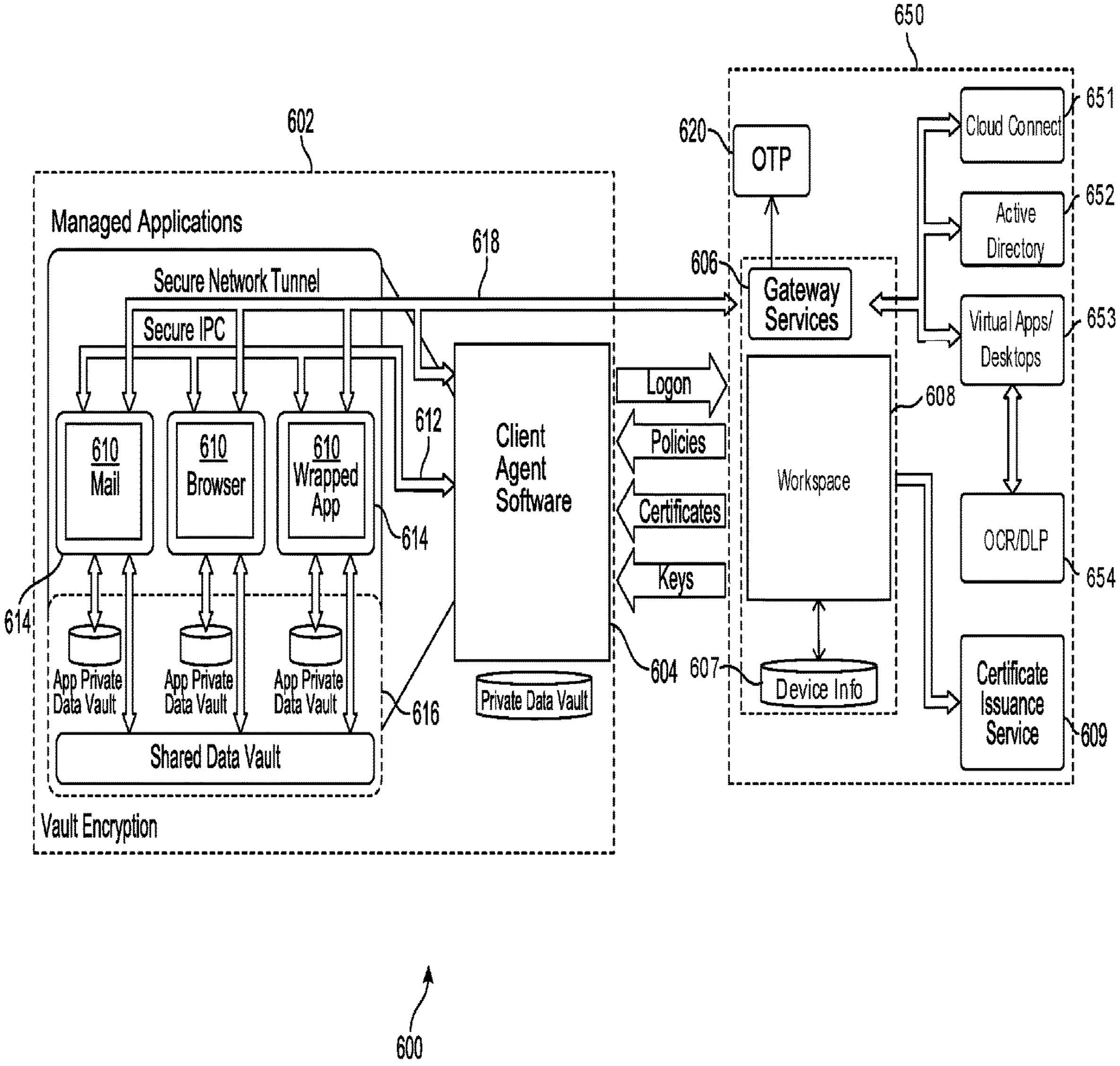
FIG. 6 depicts another illustrative enterprise mobility management system, which may be a sensitive content management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various virtual apps/desktops 653 and other resources, such as an active directory 652 resource, as shown on the right hand side above. The services and components on the right hand side may collectively be referred to as a sensitive content management system 650, the functions of which are described in more detail below.

The client agent 604 acts as the UI (user interface) intermediary for virtual apps/desktops 653 hosted by the sensitive content management system 650, which may be accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services (e.g., virtual apps/desktops 653, active directory 652). The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources (e.g., virtual apps/desktops 653, active directory 652). Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (also known as NETSCALER ACCESS GATEWAY). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an exchange server (not shown) over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 652 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Sensitive Content Based Device Selection

In order to manage secure access to sensitive content, a sensitive content management system 650 may gather security information about various user devices, including their security features and contextual information indicating whether the device is in a secure environment. The sensitive content management system 650 may be aware of a plurality of devices associated with a particular user, and may obtain such security information for each of the devices associated with a user. Such security information may be used to generate a security rating, or to otherwise determine which devices associated with a user are more secure than others.

The sensitive content management system 650 may also scan content provided to a particular user device to determine whether the content is sensitive and, after detecting that the content is sensitive, may recommend or require that the content be accessed on a different user device that is more secure, or using different (e.g., more secure) settings on the same device.

Figure 7:
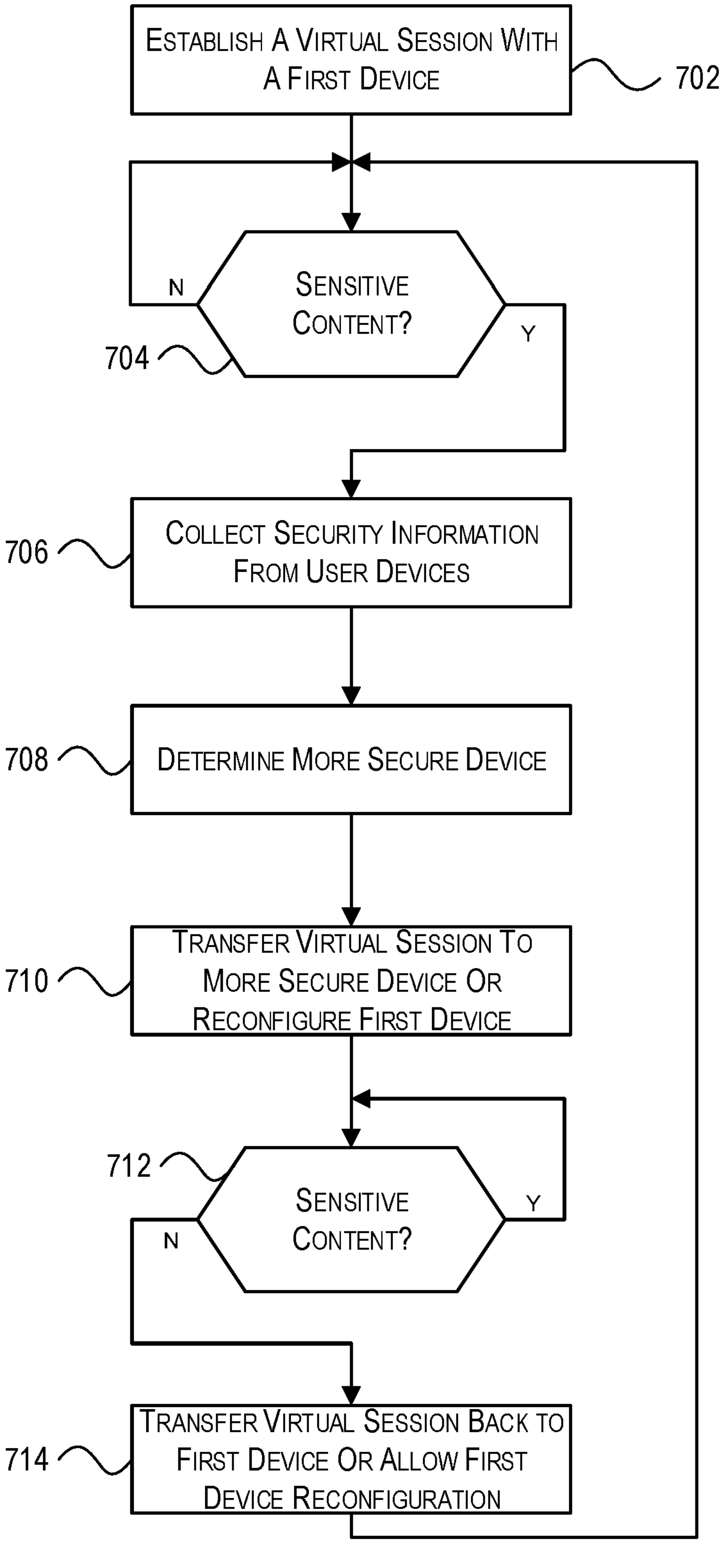
FIG. 7 depicts an illustrative algorithm for secure device selection based on sensitive content detection.

FIG. 7 depicts an illustrative algorithm for increasing the security of a session based on the detection of sensitive content. In step 702, a sensitive content management system 650 may establish a virtual session with a first device. The first device may be a personal device owned by or otherwise associated with a user, a device provided by a corporation employing the user or some other entity in a business relationship with the user, or any other device on which the user may have access to potentially sensitive content (e.g., a public device on which the user can access a corporate network, for example). The sensitive content management system 650 may establish a connection with the user device using enterprise access and/or management software, such as application and/or desktop virtualization software, remote desktop software, or other software for managing a session that provides access to potentially sensitive content.

At step 704, the sensitive content management system 650 may detect (using, for example, an optical character recognition/data loss prevention (OCR/DLP) service 654 implemented by the sensitive content management system 650 or a third party service) whether content being delivered to the user via the virtual session is sensitive content. The sensitive content management system 650 may scan the content (e.g., using image, audio, and/or text recognition) to identify potentially sensitive content. If the content is not identified as sensitive, the sensitive content management system 650 may continue scanning. If the content is identified as sensitive, the sensitive content management system 650 may flag the sensitive content and then continue scanning. The flag may be transmitted to the user device as part of the virtual session, and the user device may then block display or other output of the sensitive content and/or determine whether the user may be willing to transfer the virtual session to a more secure device.

At step 706, the sensitive content management system 650 may collect security information associated with each of a plurality of devices associated with the user of the first device. For example, a user may have access to or regularly use a first laptop, a second laptop, a tablet, a mobile phone, and a television. The sensitive content management system 650 may obtain (e.g., directly from each device, or from a database storing security information about each associated device) security information for each device, such as a screen size of a device, whether a device usually connects via a secured network, whether a device requires two-factor authentication to log in, and other such security information. The sensitive content management system 650 may further obtain contextual information directly from each of the plurality of devices, which may indicate a current security context of the device. Such contextual information may indicate the current location of a mobile device, whether the device is connected to a corporate or public network, whether an external display is connected, whether peripheral devices are connected (e.g., via a personal area network such as IEEE 802.15 ("Bluetooth"), etc.), whether the first user is currently using the device (e.g., based on user presence information, which may be determined in a variety of ways), whether other users are logged in, whether any other users are currently looking at a display of the device (e.g., as determined using eye tracking hardware), or other such contextual information.

At step 708, the sensitive content management system 650 may use the security and contextual information to determine a more secure device and/or a more secure configuration of the currently used device. In some cases, the sensitive content management system 650 may generate a security score for each device using the security and contextual information. For example, certain rules or machine learning models may be used to output a security score based on the security and contextual information. Additionally or alternatively, certain rules or machine learning models may be used to output one or more security scores for different configurations of the currently used device that reflect hypothetical security and contextual information corresponding to each configuration. The sensitive content management system 650 may then rank the devices and/or configurations by security score to determine whether any device(s) and/or configurations are more secure. Additionally or alternatively, the sensitive content management system 650 may determine whether another device is within a certain distance of a user, whether the other device has more security features, or otherwise meets certain criteria to be considered a more secure device that may be used to access the sensitive content.

At step 710, the sensitive content management system 650 may cause the virtual session to be transferred to the more secure device and/or require the currently used device to change to a more secure configuration. The sensitive content management system 650 may send a notification to the first user device that causes the first user device to display a message requesting or instructing the first user to access the sensitive content via the more secure device and/or using the more secure configuration. The first user device may then block display of the sensitive content and/or close the virtual session until the user of the first user device switches to the more secure device or the more secure configuration. In the case of a session transfer to a more secure device, the sensitive content management system 650 may send connection information to the more secure device that causes the more secure device to connect to the sensitive content management system, and the sensitive content management system 650 may then transfer the virtual session to the more secure device.

At step 712, the sensitive content management system 650 may continue monitoring the virtual session for sensitive content. If the virtual session continues to include sensitive content, the sensitive content management system 650 may continue monitoring the virtual session while maintaining the session with the more secure device and/or more secure configuration. If the sensitive content management system 650 detects that the virtual session no longer contains sensitive content, the sensitive content management system 650 may request or instruct transfer of the virtual session back to the first device, and/or allow the device to adopt a less secure configuration. For example, the sensitive content management system 650 may send an instruction for the more secure device to display a menu requesting whether the user would like to switch back to the first device and/or a less secure configuration, and, upon receiving a user selection to transfer back to the first device, determine to proceed to cause the session to be transferred back to the first user device.

Figure 8A:
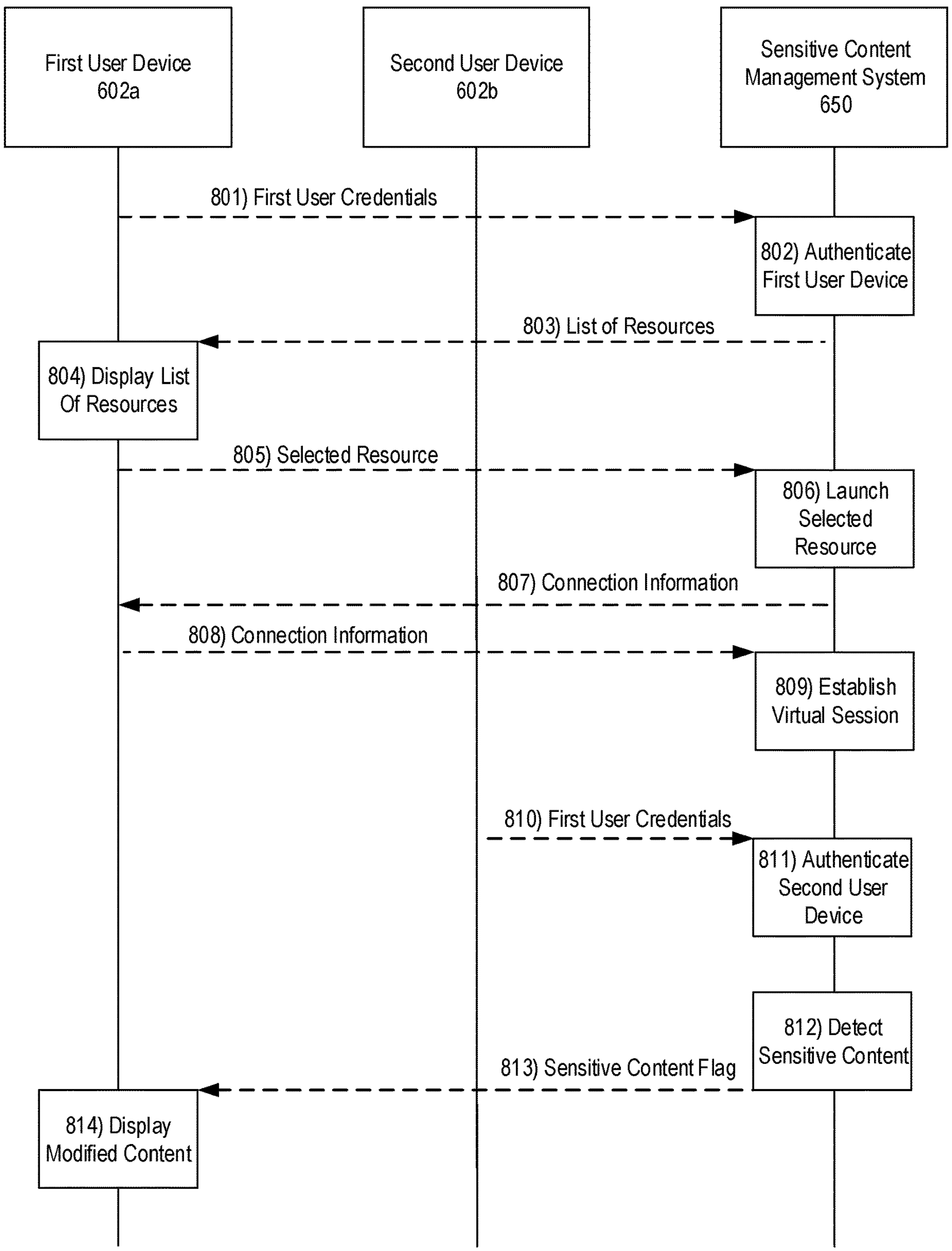
FIGS. 8A-8C depict and illustrative event sequence according to the algorithm for secure device selection based on sensitive content detection.
Figure 8B:
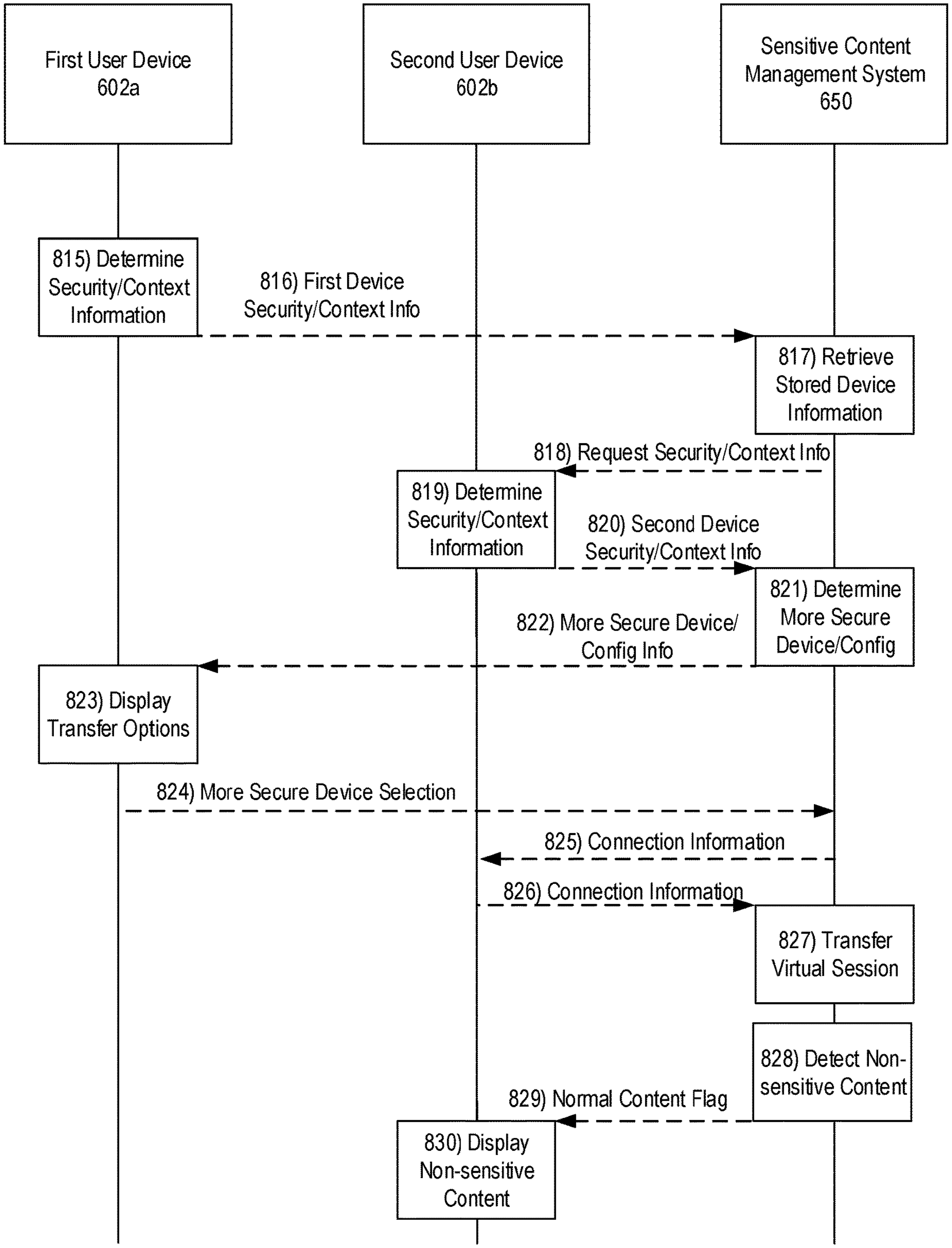
Figure 8C:
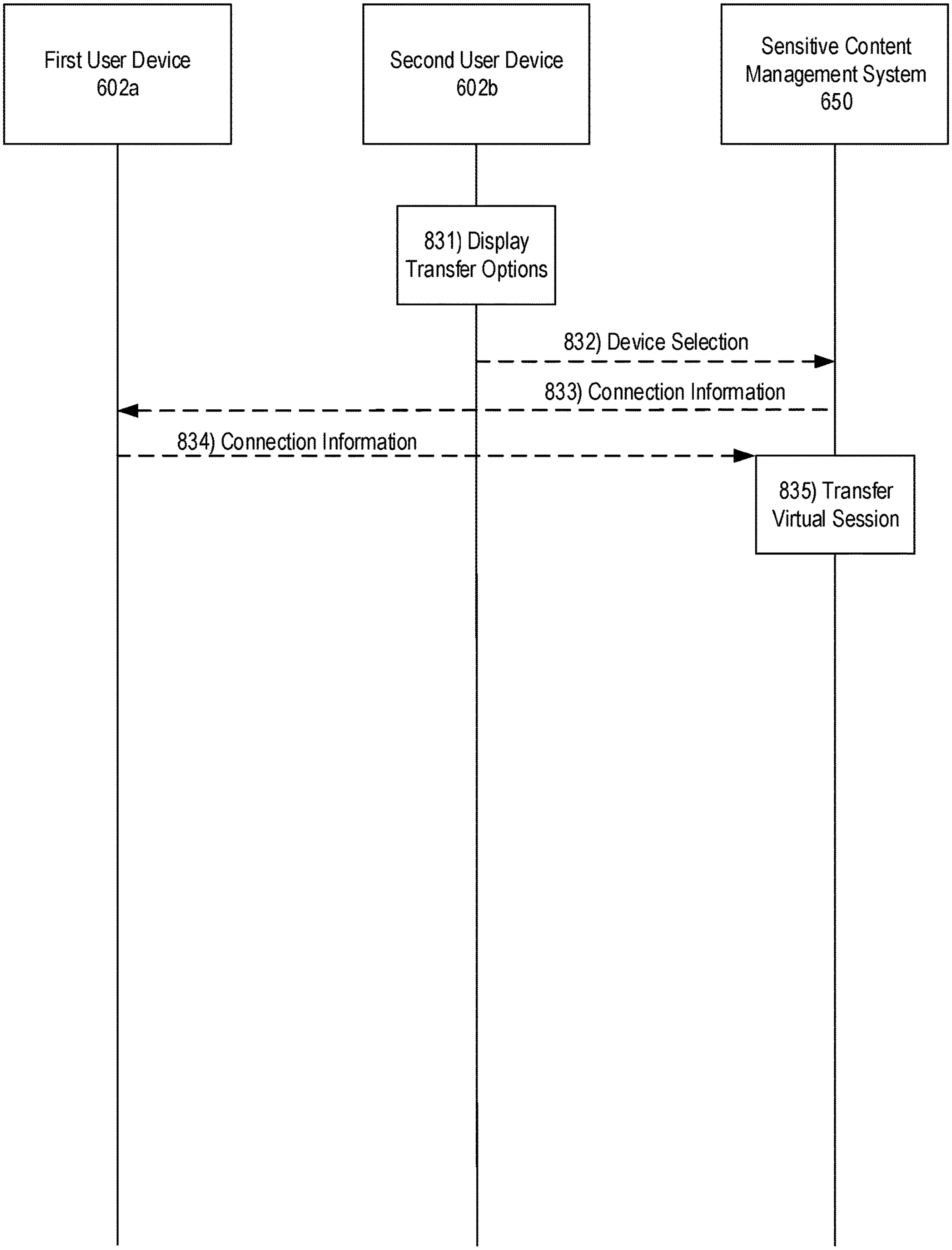

At step 714, if necessary, the sensitive content management system 650 may cause the session to be transferred back to the first device, which may work in much the same way as step 110. For example, the more secure device may close the virtual session on the more secure device while the user switches to the first user device and/or transfer the virtual session back to the first user device. The sensitive content management system 650 may send connection information to the first user device that causes the first user device to reconnect to the sensitive content management system if necessary, and the sensitive content management system 650 may then transfer the virtual session back to the first user device FIGS. 8A-8C show an illustrative event sequence for transferring sessions between devices based on sensitive content detection. The exemplary event sequence of FIGS. 8A-8C may be an example of execution of the algorithm of FIG. 7.

At step 801, a first user device 602*a* may begin or resume a session by transmitting first user credentials to the sensitive content management system 650. The credentials may be authentication, login, and/or secondary credentials as described above, or may be some other type of credentials sufficient to authenticate a user of the first user device 602*a* so as to begin or resume a virtual session. Upon receiving the credentials, the sensitive content management system 650 may authenticate the user at step 802 for one or more services, using various techniques as described above.

At step 803, the sensitive content management system 650 may transmit a list of resources for the user. The list of resources may comprise various applications, desktops, or other resources which the user may wish to access. For example, the list of resources could include a first virtual desktop, a second virtual desktop, an email service, an active directory service, or the like. The list of services may include active sessions previously established by the user (e.g., a suspended virtual desktop), favorite services of the user, a list of default services, and the like. Upon receiving the list of resources, at step 804 the first user device may display the list of resources and wait to receive a user selection of a particular resource.

In some situations, steps 803 and 804 may not be necessary because, for example, a system policy and/or user preference may specify that a particular resource should launch upon connection. For example, a system policy and/or user preference may specify a default resource (e.g., a particular application or desktop) that should launch after authentication. Additionally or alternatively, upon authentication of a particular device associated with a user, a virtual session that was previously accessed on another device associated with the same user may be automatically provided to the particular device (e.g., thus providing a device "session roaming" feature).

At step 805, after selection of a particular resource (e.g., by the user and/or via a policy, a preference or a session roaming feature), the first user device 602*a* may transmit the selected resource (if necessary) to the sensitive content management system 650. At step 806, the sensitive content management system 650 may launch (if necessary) and/or resume (e.g., by waking a suspended virtual desktop or application) the selected resource. Then, at steps 807 and 808, the sensitive content management system 650 and the first user device 602*a* may swap connection information as necessary before establishing and/or resuming a virtual session at step 809. In some cases, at steps 807 and 808, the sensitive content management system 650 may request, and the first user device may send, security and/or contextual information for the first user device, as will be further discussed below. The connection information may include a launch ticket (e.g., generated by the virtual apps/desktops 653), which may be provided to the first user device 602*a*. The first user device 602*a* may then provide the launch ticket to the gateway server 606, which may in turn send connection information to the virtual apps/desktops 653 in order to establish a direct connection between the gateway server 606 and the virtual apps/desktops 653 (not shown in FIG. 8A) before establishing a direct connection between the first user device 602*a* and the virtual apps/desktops 653. The establishment of the virtual session at step 809 may further include the verification of any licenses and the application of session policies.

At step 810, a user (e.g., the same user of the first user device 602*a*) may provide credentials from a second user device 602*b* to the sensitive content management system 650, which may authenticate the user of the second user device 602*b* in the same way as for step 802. The sensitive content management system 650 may optionally then continue to establish a session with the second user device 602*b* as described above for steps 803-809. Although the example event sequence shows steps 810 and 811 occurring after a first session is established in step 809, steps 810 and 811 could occur at any time with respect to steps 801-809 (e.g., before, simultaneously, after, etc.).

During the established session with the first user device, the OCR/DLP service 654 and/or virtual apps/desktops service 653 may continually monitor content of the virtual application or desktop to detect sensitive content (e.g., as illustrated at step 812). Content delivered via the session may be transmitted (e.g., by the virtual apps/desktop service 653) to the OCR/DLP service 654. Some or all of the content may be transmitted to and/or monitored by the OCR/DLP service 654. For example, the OCR/DLP service may receive and/or analyze a frame of content every particular time period (e.g., every X milliseconds) and/or whenever the content being accessed is changed (e.g., when a user opens or closes content, scrolls content, minimizes or maximizes content, and the like). In some cases, the virtual apps/desktops service 653 may determine when to send a frame of content to the OCR/DLP service 654 for analysis (e.g., based on the predetermined time period elapsing and/or a change in content being accessed). By not analyzing every frame of content, the processing power required to scan for sensitive content may be reduced.

The OCR/DLP service 654 may use optical character recognition (OCR) to convert an image of the content to textual data. Other methods of text extraction may also be used (e.g., textual data may be embedded in the content and extracted). The textual data, however it is recognized or extracted, may be scanned for certain key words or phrases, and/or searched using regular expressions or other pattern matching techniques, that may indicate the content is sensitive content. Thus, the OCR/DLP service 654 may use one or more lists to detect sensitive content. The lists may be generic (e.g., a list of keywords and phrases indicating sensitive business content, such as "confidential" or "attorney/client privileged," and/or regular expressions or other patterns that may match sensitive content) or specific to one or more businesses, industries, roles of the user, and the like. Multiple lists may be used (e.g., the OCR/DLP service 654 may monitor for sensitive words or phrases from a generic list, a list corresponding to a particular business associated with the established session, and/or a list corresponding to the particular department or role of the user with which the session is established).

The OCR/DLP service 654 may determine that content is sensitive or not (e.g., a binary determination) based on the presence or absence of words from one of the lists. The OCR/DLP service 654 may detect that a sensitive word is present based on an exact match to a word or phrase in a list, a partial match of a word or phrase in a list, a match of a regular expression in a list, and/or other such pattern matching). Additionally or alternatively, the OCR/DLP service 654 may determine an overall security score using various methods. In one such method, one or more keywords or phrases from each list may be associated with a numeric score (e.g., the word "confidential" may be associated with a score of "50", the phrase "financial data" may be associated with a score of "20," etc.). The OCR/DLP service may thus add or otherwise combine the scores of various detected words/phrases/regular expressions to determine an overall sensitivity score. Additionally or alternatively, the OCR/DLP service may use a trained model to determine an overall sensitivity score for text recognized and/or otherwise extracted from content. Such a model may have been trained using machine learning techniques (e.g., by developing a model using a training data corpus including various sensitive and non-sensitive content items, each associated with a target variable indicating a sensitivity level of the corresponding target item) such that the trained model can output a sensitivity score based on input text. In embodiments where the OCR/DLP service determines a sensitivity score, various thresholds may be used to categorize the content as sensitive, non-sensitive, semi-sensitive, and the like. For example, the OCR/DLP service may compare the sensitivity score to one or more thresholds and categorize the sensitivity level accordingly based on the comparison. Thus, as shown at step 812, the sensitive content management system 650 (e.g., using the OCR/DLP service 654 of the sensitive content management system 650) may detect sensitive content.

In some cases, the OCR/DLP service 654 may determine where on the screen the sensitive content is located. For example, an OCR process and/or a text extraction process of the OCR/DLP service 654 may tag recognized words with location data indicating absolute or relative (e.g., with respect to other display elements) display position data, such as coordinates. Then, if a word is recognized as sensitive, the location data associated with the word may be marked as sensitive location data.

In addition to or as an alternative to the OCR/DLP service 654, the sensitive content management system 650 may determine that content is sensitive using other methods. For example, files or other content accessed via a virtual session may be marked as sensitive (e.g., using a flag stored with the file/content or other metadata related to the file/content), such that whenever a user accesses such designated content, the virtual apps/desktops service 653 and/or the sensitive content management system 650 may detect sensitive content.

In response to detecting sensitive content at 812, at step 813 the sensitive content management system 650 may embed a sensitive content flag in the content transmitted to the first user device 602*a*, or may otherwise transmit a sensitive content flag to the first user device 602*a*. To transmit the sensitive content flag, the OCR/DLP service 654 may send a sensitive content indication to the virtual apps/desktops service 653 that the session contains sensitive content, and the virtual apps/desktops service 653 may in turn embed the sensitive content flag into the content or otherwise transmit the sensitive content flag. Additionally or alternatively, the virtual apps/desktops service 653 may detect that sensitive content is being accessed and transmit the sensitive content flag to the first user device 602*a*.

The sensitive content flag may be a data structure indicating one or more of whether the content is sensitive, how sensitive the content is (e.g., a sensitivity score), particular words or phrases recognized as sensitive and corresponding sensitivity scores for each word or phrase, and/or location data for each sensitive word or phrase.

The sensitive content flag may be periodically and/or continually sent as long as sensitive content is still being detected by the OCR/DLP service 654. Thus the OCR/DLP service 654 may continually scan the content and continue causing the transmission of a sensitive content flag as long as sensitive content is detected. Alternatively, the sensitive content management system 650 may only send the sensitive content flag when sensitive content is first detected until a subsequent change to the sensitive content status.

At step 814, in response to receiving the sensitive content flag (e.g., embedded in content or via a separate channel) the first user device 602*a* may display the content of the session in a modified form.

In some cases, the first user device 602*a* may display the sensitive content in a redacted form. The first user device 602*a* may thus redact display of part or all of the sensitive content (e.g., by blacking or graying out the sensitive content, covering the sensitive content with an overlay, or other ways of obscuring the sensitive content). The first user device 602*a* may, for example, redact the display of a content display area of a particular application, while continuing to display a user interface, menus, and the like. If the session includes multiple applications (e.g., if the session is a virtual desktop session), in some cases the first user device may redact the content of an application containing sensitive content (e.g., as determined by location data of a sensitive content flag) while permitting full display of content of other applications.

The first user device 602*a* may also redact only portions of the sensitive content. For example, the first user device may block all content that is nearby content that is determined to be sensitive. As one more specific example, if sensitive data is detected within a table, list, or other displayed data structure, the entire table, list, or other displayed data structure may be redacted. In another example, if sensitive data is detected within an image, the entire image may be redacted. In another example, if sensitive data is detected within a particular page, section, chapter, or other content group, the entire page, section, chapter, or other content group may be redacted.

In some cases, an amount of redaction may depend on a sensitivity score or category. For example, for a low sensitivity score or low sensitivity category, relatively less data may be redacted (e.g., only data nearby the sensitive terms), but for relatively higher sensitivity score or categories, comparatively more data may be redacted. Thus the redaction may be based on an indication of sensitivity, such as a sensitivity score or category.

In addition to or as an alternative to redacting sensitive content, at step 814 the content may be modified by displaying a warning indicating that the content is sensitive. Such a warning may be displayed as an overlay (e.g., a popup) after sensitive content is detected. Additionally or alternatively, the session may display a persistent warning (e.g., text indicating "Sensitive Content Detected," a red outline around the content, etc.) when sensitive content has been detected. The persistent warning may be continually displayed for a certain length of time after a sensitive content flag has been received. Additionally or alternatively, a corresponding confirmation may be displayed when sensitive content has not been detected (e.g., text indicating "No sensitive content detected," a green outline around the content, etc.).

The redaction and/or other modification (e.g., by adding a warning) of content may be performed by a user device as described above. Additionally or alternatively, the redaction and/or other modification of content may be performed by a separate device (e.g., by the sensitive content management system 650 and/or the OCR/DLP service 654 before the content is transmitted to the first user device 602*a*).

At step 815, the first user device 602*a* may determine security and contextual information about the first user device 602*a*. The security and contextual information may indicate whether the first user device 602*a* is a secure device and/or is being used in a secure context. The security information may include information indicating a screen size of the first user device 602*a*, whether the first user device 602*a* usually connects via a secured network, whether the first user device 602*a* requires two-factor authentication to log in, and other such security information. The contextual information may indicate the current location of the first user device 602*a*, whether the first user device 602*a* is connected to a corporate or public network, whether an external display is connected to the first user device 602*a*, whether Bluetooth or other peripheral devices are connected to the first user device 602*a*, whether the first user is currently using the first user device 602*a* (e.g., based on user presence information, which may be determined by a time since a most recent user input), whether other users are logged in to the first user device 602*a*, whether any other users are currently looking at a display of the first user device 602*a* (e.g., as determined using eye tracking hardware), or other such contextual information.

At step 816, the first user device 602*a* may transmit the security and contextual information to the sensitive content management system 650. In some cases, the first user device 602*a* may have previously determined and transmitted the security information, which may be relatively more static than the contextual information, which may be relatively more dynamic. Therefore, in some cases, the first user device 602*a* only determines and transmits the contextual information at steps 815 and 816.

At step 817, the sensitive content management system 650 may retrieve any stored device information for the first user device 602*a* and/or other user devices (e.g., the second user device 602*b*) associated with the first user. The device information may be stored in a device information database 607 of the sensitive content management system 650. The device information database 607 may store device security and/or contextual information (as well as other information) for a plurality of devices. Each of the plurality of devices may be associated with one or more users. Some of the information may be timestamped to indicate when it was determined and/or received by the sensitive content management system 650 (e.g., the contextual information). In some cases, the sensitive content management system 650 may delete, from the device information database 607, information associated with timestamps of a given age (e.g., contextual information more than an hour old may be deleted). Thus, for example, the sensitive content management system 650 may retrieve previously-stored security information for the first user device 602*a*, the second user device 602*b*, and any other user devices associated with the first user (not shown).

At step 818, the sensitive content management system 650 and/or the workspace component 608 may request updated security and/or contextual information, if necessary, from any other devices associated with the first user. For example, if the device information database 607 does not contain up-to-date security and/or contextual information for the second user device 602*b*, the sensitive content management system 650 and/or the workspace component 608 may send a request for updated security and/or contextual information to the second user device 602*b*. The sensitive content management system 650 and/or the workspace component 608 may send one or more other requests to one or more other devices associated with the user as well (not shown).

In some cases, step 818 may not be necessary for some devices because the devices may be configured to send updated security and/or contextual information whenever the security and/or contextual information changes. For example, a device may be configured to send an update whenever a network changes (e.g., from a mobile LTE network to an IEEE 802.11 ("WIFI") network), whenever an external monitor is attached, and the like. The workspace component 608 may store such data in the device information database 607. Continual monitoring of the state of various devices may beneficially increase the speed of a session transfer, if necessary.

At step 819, the second user device 602*b* may determine security and/or contextual information for the second user device 602*b*, as requested by the sensitive content management system 650. The security and contextual information may indicate whether the second user device 602*b* is a secure device and/or is being used in a secure context. The security information may include information indicating a screen size of the second user device 602*b*, whether the second user device 602*b* usually connects via a secured network, whether the second user device 602*b* requires two-factor authentication to log in, and other such security information. The contextual information may indicate the current location of the second user device 602*b*, whether the second user device 602*b* is connected to a corporate or public network, whether an external display is connected to the second user device 602*b*, whether Bluetooth or other peripheral devices are connected to the second user device 602*b*, whether the first user is currently using the second user device 602*b* (e.g., based on user presence information, which may be determined by a time since a most recent user input), whether other users are logged in to the second user device 602*b*, whether any other users are currently looking at a display of the second user device 602*b* (e.g., as determined using eye tracking hardware), or other such contextual information. At step 820, the second user device 602*b* may transmit the security and contextual information to the sensitive content management system 650.

At step 821, the sensitive content management system 650 may determine one or more devices and/or configurations that are more secure than the current configuration of the first user device 602*a*. For example, the sensitive content management system 650 may rank the first user device 602*a*, the second user device 602*b*, and any other devices associated with the first user (not shown) based on the respective security and/or contextual information associated with each device to determine a more secure device (or whether there is not a more secure device). Additionally or alternatively, the sensitive content management system 650 may rank one or more alternate configurations of the first user device 602*a* (e.g., a configuration where the user disconnects an external monitor, a configuration where the user disconnects from public WIFI and uses a carrier mobile network, a configuration where the user uses a smaller device screen instead of a larger device screen, and the like).

The sensitive content management system 650 may use one or more rules to score each security and/or contextual information feature associated with each device and/or configuration in order to determine a security ranking score for each device and/or configuration. For example, a particular screen size may be associated with a particular security score (e.g., a bigger screen size may be less secure), a type of network may be associated with a particular security score (e.g., a public wireless network may be less secure than a private carrier mobile network), and the like. The sensitive content management system 650 may then combine the security scores for each feature (e.g., using summing, weighted averaging, and/or more complex formulas) to determine a security ranking score for each device and/or configuration, and then rank the devices and/or configurations accordingly.

Additionally or alternatively, a trained model may be used to score the devices and/or configurations based on the security and/or contextual information for each corresponding device and/or configuration. Such a model have been trained (e.g., using machine learning techniques) based on a training data corpus including various sets of security and/or contextual information, each set associated with a security score. Thus the sensitive content management system 650 may use the trained model to take security and/or contextual information for each device and/or configuration as an input and the trained model may then output a corresponding security score for each device and/or configuration. The sensitive content management system 650 can then rank the devices and/or configurations accordingly based on the security scores output by the trained model.

The sensitive content management system 650 may determine a more secure device and/or configuration based on the ranking. The more secure device may be used to transfer a session containing sensitive content so that the user may access the sensitive content on the more secure device. Alternately, a more secure configuration may be used so that the session may remain on the first user device 602*a*. Any devices that score higher than the device being used by the user (e.g., the first user device 602*a*) may be potentially selected as a more secure device to which the session may be transferred. Additionally or alternatively, configurations that score higher than the configuration being used by the user may be potentially selected as a more secure configuration. In some cases, the sensitive content management system 650 may filter out certain devices and/or configurations so that the devices are not considered as a potential transfer target. For example, if a device or configuration ranked higher than the first user device 602*a* is not above a certain security score threshold, it may not be considered. Additionally or alternatively, if a device ranked higher than the first user device 602*a* is not nearby the first user device 602*a* (e.g., if the locations of the devices differ by more than a threshold distance, the devices are connected to different networks, or the like), then the higher ranked device may be filtered out from further consideration as a more secure device.

After determining at least one more secure device and/or configuration, at step 822 the sensitive content management system 650 transmits information identifying the more secure device(s) and/or configurations to the first user device 602*a*. In the illustrated example, the information identifying the more secure device(s) and configurations may include information identifying the second user device 602*b*, which the user selects in the illustrated event sequence. The information identifying the more secure device(s) and/or configurations may also identify other devices (not shown) and alternate configurations of the first user device 602*a*. The information may include a name of the more secure device when applicable (e.g., "Your laptop," "Projector in Conference Room A," or the like), a description of the device attributes such as screen size, security features, connection ports, and the like, and/or other information about the more secure device, and/or names or instructions for entering a more secure configuration when applicable (e.g., "Remain on device but turn off public WIFI").

At step 823, the first user device may display information indicating that the user may transfer the session to one of the more secure device(s) or use an alternate configuration. The displayed information may include the name of the more secure device, a description of the more secure device, and/or other information about the more secure device, as well as names and descriptions of any alternate configurations. The user may be presented with an option to accept or reject the transfer of the session to the more secure device and/or with an option to enter the alternate configuration.

In some cases, the user may not be given an option to decline the transfer to a more secure device or use of an alternate configuration, and at step 823 the display may indicate that the session must be transmitted to a more secure device and/or that a more secure configuration must be used. In some cases, the first user device 602*a* may present an option to decline transfer of the session or use an alternate configuration if the content is below a threshold sensitivity level (e.g., as determined by a sensitivity score of the sensitive content flag transmitted at step 813), and may automatically transfer the content or use a more secure configuration if the content is above the threshold. Thus the user may have more control when accessing less sensitive content. If a user enters a more secure configuration, then any redaction or modification of content (e.g., as applied in step 814) may be removed and the sensitive content may be displayed again.

At step 824, the first user device 602*a* may transfer a selected device of the more secure device(s) presented at step 823 to the sensitive content management system 650 so that the sensitive content management system 650 may cause the session to be transferred to the selected device. In the illustrated example, the selected device is the second user device 602*b*, so the sensitive content management system 650 may transfer the session to the second user device 602*b*. The selected device may be stored in the device information database 607 as a user preference associated with the first user. In some cases, this selection may be used as a default option in the future and/or may be used to automatically transfer the session (e.g., without prompting for a user selection) in the future.

In steps 825 and 826, the sensitive content management system 650 and the second user device 602*b* may swap connection information as necessary before transferring the session to the second user device 602*b* at step 827. The connection information may include a launch ticket (e.g., generated by the virtual apps/desktops 653), which may be provided to the second user device 602*b*. The second user device 602*b* may then provide the launch ticket to the gateway server 606, which may in turn send connection information to the virtual apps/desktops 653 in order to establish a new direct connection between the gateway server 606 and the virtual apps/desktops 653 (not shown in FIG. 8B) before establishing a direct connection between the first user device 602*a* and the virtual apps/desktops 653 in steps 807-809. Additionally or alternatively, the existing connection between the gateway server 606 and the virtual apps/desktops service 653 (e.g., from the first session with the first user device 602*a*) may be reused to establish a direct connection between the second user device 602*b* and the virtual apps/desktops service 653 (e.g., to establish the second session at step 827).

While the session continues at the second user device 602*b*, the OCR/DLP service 654 and/or virtual apps/desktops service 653 may continue monitoring for sensitive content. While sensitive content is detected (e.g., content having a sensitivity score above a certain threshold), the system may continue transmitting a sensitive content flag within the content or otherwise. However, at step 828, the OCR/DLP service 654 and/or virtual apps/desktops service 653 may determine that session no longer contains sensitive content. The detection of whether the session no longer contains sensitive content may occur as described above for step 812.

At step 829, the sensitive content management system 650 may embed a normal content flag in the content transmitted to the second user device 602*b*, or may otherwise transmit a normal content flag to the second user device 602*b*. To transmit the normal content flag, the OCR/DLP service 654 may send a normal content indication to the virtual apps/desktops service 653 indicating that the session does not contain sensitive content, and the virtual apps/desktops service 653 may in turn embed the normal content flag into the content or otherwise transmit the normal content flag. Additionally or alternatively, the virtual apps/desktops service 653 may detect that sensitive content is not being accessed based on file metadata or other information associated with files or content.

The normal content flag may be a data structure indicating that the content is not sensitive and/or a sensitivity level (e.g., a sensitivity score, which may be below a certain threshold). The normal content flag may be periodically and/or continually sent as long as sensitive content is not being detected by the OCR/DLP service 654 and/or virtual apps/desktops service 653. Thus the OCR/DLP service 654 and/or virtual apps/desktops service 653 may continually scan the content and continue causing the transmission of a normal content flag as long as sensitive content is not detected. Alternatively, the normal content flag may only be sent when the OCR/DLP service 654 and/or virtual apps/desktops service 653 detects a change from sensitive content to normal content.

At step 830, the second user device 602*b* may display the session content without any modification. Additionally or alternatively, the second user device 602*b* may display an indication that the content is not sensitive content (e.g., text indicating "No sensitive content detected," a green outline around the content, etc.).

At step 831, the second user device 602*b* may display one or more transfer option(s) to transfer the session back to the first user device 602*a* or another user device. In some cases, the second user device 602*b* may use a timeout starting at the time when sensitive content is no longer detected before displaying the transfer options. For example, if sensitive content is being displayed on one page of document, the user may scroll to a next page that does not have sensitive content for a brief period of time, but then may scroll back up to the page containing sensitive content. The second user device 602*b* may thus wait a certain amount of time after detection of non-sensitive content before offering the transfer options.

The transfer options may include an option to transfer the content back to the first user device 602*a* or another device. The user may select one of the options or decline the transfer of the session.

At step 832, the second user device 602*b* may transmit a selected device back to the sensitive content management system 650. In the illustrated example, the selected device may be the first user device 602*a* (e.g., the user selected an option to transfer the session back to the previous device).

In steps 833 and 834, the sensitive content management system 650 and the first user device 602*a* may swap connection information as necessary before transferring the session back to the first user device 602*a* at step 835. The connection information may include a launch ticket (e.g., generated by the virtual apps/desktops 653), which may be provided to the first user device 602*a*. The first user device 602*a* may then provide the launch ticket to the gateway server 606, which may in turn send connection information to the virtual apps/desktops 653 in order to establish a new direct connection between the gateway server 606 and the virtual apps/desktops 653 (not shown in FIG. 8C) before establishing a direct connection between the first user device 602*a* and the virtual apps/desktops 653. Additionally or alternatively, the existing connection between the gateway server 606 and the virtual apps/desktops service 653 (e.g., from the previous session(s)) may be reused to establish a direct connection between the first user device 602*a* and the virtual apps/desktops service 653 (e.g., to re-establish the first session at step 835).

The process may then proceed as discussed above, with the OCR/DLP service 654 continuing to monitor for sensitive content so that the sensitive content management system 650 can transfer the session to a more secure device as appropriate.

What is claimed is:

1. A system comprising:

one or more processors;

a non-volatile memory storing instructions that when executed by the one or more processors causes the one or more processors to:

identify content being accessed via a remote session hosted by a first device to be sensitive content, based on a sensitivity score associated with the content meeting a predetermined threshold, wherein the remote session is virtual session;

responsive to the content being sensitive content, identify one or more security features of the first device and a second device, the one or more security features being indicative of security of environments in which the first and second devices operate;

determine, based on the one or more security features, a difference in a level of security of the environments in which to operate the first and second devices; and responsive to determining the second device as having a higher level of security than the first device, transfer the remote session from the first device to the second device; and responsive to determining that sensitive content is no longer being accessed, transfer the remote session back to the first device;

wherein to determine the difference in the level of security of the environments comprises:

generating security scores for the first and second devices; and ranking the first and second devices based on the corresponding security scores.

2. The system of claim 1, wherein the level of security of the environments is based on security scores for the first and second devices.

3. The system of claim 2, wherein the security scores are based on configurations of the first and second devices.

4. The system of claim 2, wherein the security scores are based on locations of the first and second devices.

5. The system of claim 2, wherein the security scores are determined using a trained machine learning model.

6. The system of claim 1, wherein execution of the instructions further causes the processor to, responsive to a determination that at least a portion of the content is sensitive content, transmit, to the first device or the second device having the remote session, an indication that the content is sensitive content.

7. A method comprising:

identifying content being accessed via a remote session hosted by a first device to be sensitive content, based on a sensitivity score associated with the content meeting a predetermined threshold, wherein the remote session is virtual session;

responsive to the content being sensitive content, identifying one or more security features of the first device and a second device, the one or more security features being indicative of security of environments in which the first and second devices operate;

determining, based on the one or more security features, a difference in a level of security of the environments in which to operate the first and second devices; and responsive to determining the second device as having a higher level of security than the first device, transferring the remote session from the first device to the second device; and responsive to determining that sensitive content is no longer being accessed, transferring the remote session back to the first device;

wherein determining the difference in the level of security of the environments comprises:

generating security scores for the first and second devices; and ranking the first and second devices based on the corresponding security scores.

8. The method of claim 7, wherein the level of security of the environments is based on security scores for the first and second devices.

9. The method of claim 7, wherein the security scores are based on configurations of the first and second devices.

10. The method of claim 7, wherein the security scores are based on locations of the first and second devices.

11. The method of claim 7, wherein the security scores are determined using a trained machine learning model.

12. The method of claim 7, wherein determining the difference in the level of security of the environments comprises:

generating security scores for the first and second devices; and ranking the first and second devices based on the corresponding security scores.

13. The method of claim 7, further comprising, responsive to a determination that at least a portion of the content is sensitive content, transmitting, to the first device or the second device having the remote session, an indication that the content is sensitive content.

14. The method of claim 7 wherein the remote session comprises: a virtual desktop, a virtual application, or both.

* * * * *